(12) United States Patent
Philbert et al.

(10) Patent No.: US 8,666,369 B2
(45) Date of Patent: Mar. 4, 2014

(54) MOBILE PHONE PROVIDED WITH A SECURED IDENTIFICATION SYSTEM

(75) Inventors: Jerome Philbert, Saint Martin d'Heres (FR); Charbel Makhoul, Chambery (FR)

(73) Assignee: Myriad Group AG, Zurich (CH)

( * ) Notice: Subject to any disclaimer, the term of this patent is extended or adjusted under 35 U.S.C. 154(b) by 0 days.

(21) Appl. No.: 13/136,192

(22) Filed: Jul. 26, 2011

(65) Prior Publication Data
US 2012/0164977 A1    Jun. 28, 2012

(30) Foreign Application Priority Data
Jul. 29, 2010    (FR) ..................................... 10 56260

(51) Int. Cl.
*H04M 1/66*    (2006.01)
*G06F 21/00*    (2013.01)

(52) U.S. Cl.
USPC .......................................... 455/411; 713/183

(58) Field of Classification Search
USPC ....................................................... 455/411
See application file for complete search history.

(56) References Cited

U.S. PATENT DOCUMENTS

| | | | |
|---|---|---|---|
| 6,182,229 B1 * | 1/2001 | Nielsen ............................. | 726/8 |
| 6,725,380 B1 * | 4/2004 | Forlenza et al. .................. | 726/6 |
| 2004/0171399 A1 * | 9/2004 | Uchida et al. ................. | 455/514 |
| 2007/0038474 A1 * | 2/2007 | Halsted ............................. | 705/2 |
| 2007/0156587 A1 * | 7/2007 | Yu et al. .......................... | 705/50 |
| 2008/0096606 A1 * | 4/2008 | Park et al. ..................... | 455/558 |
| 2008/0097851 A1 * | 4/2008 | Bemmel et al. ................. | 705/14 |

OTHER PUBLICATIONS

Ka-Ping Yee et al.: "Passpet: Convenient Password Management and Phishing Protection," Symposium on Usable Privacy and Security (SOUPS) 2006, Jul. 12-14, 2006, Pittsburgh, PA, USA, 12 pages.

* cited by examiner

*Primary Examiner* — Lester Kincaid
*Assistant Examiner* — Andy Gu
(74) *Attorney, Agent, or Firm* — Davidson, Davidson & Kappel, LLC

(57) ABSTRACT

A mobile phone of the type including a connection, able to allow the connection to a webpage with a particular URL, the connection to said webpage requiring the entry of a particular identifier specific to said webpage, a first storage able to store, in a database, the particular identifiers, each associated with a corresponding webpage.

The mobile phone also includes a trigger able to systematically and automatically trigger, after the entry of a particular identifier, the implementation of a selector for choosing a primary identifier shared by all webpages requiring that a particular identifier be entered, if no primary identifier has been chosen yet, and a second storage able to store a security datum depending on the primary identifier after the entry of the primary identifier.

12 Claims, 15 Drawing Sheets

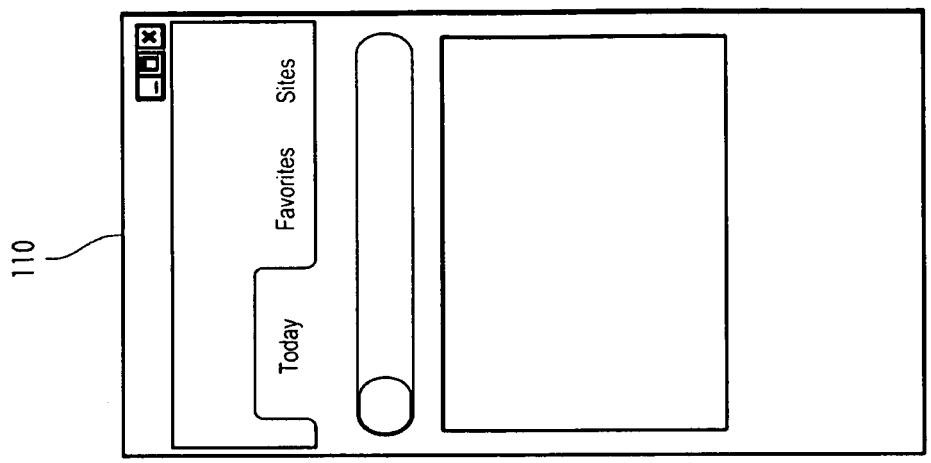
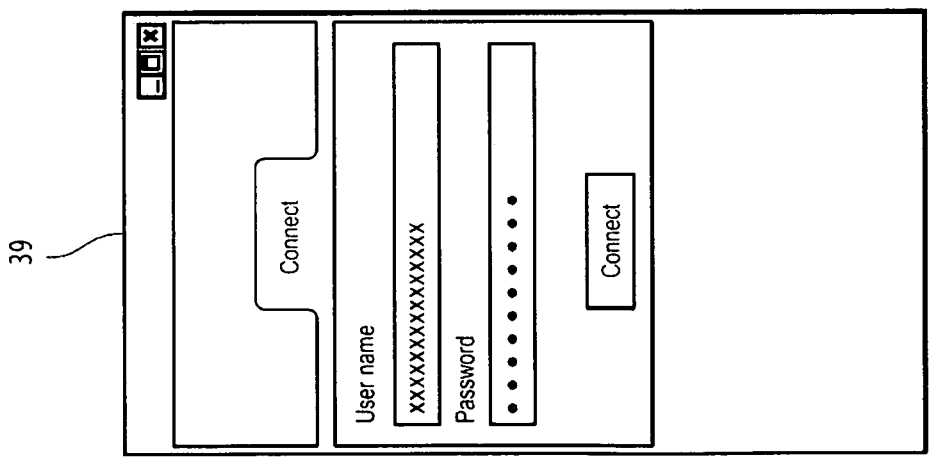

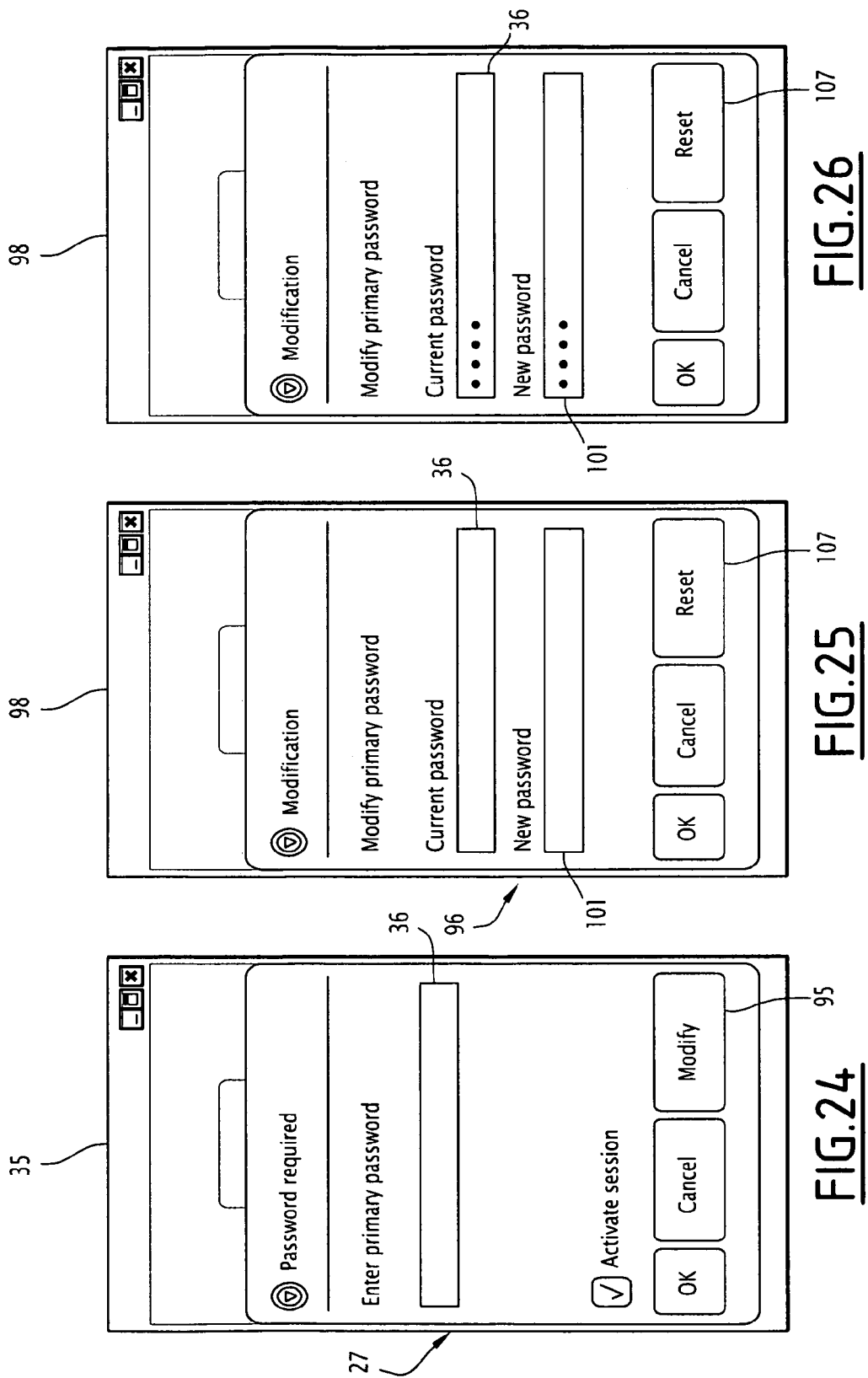

MOBILE PHONE PROVIDED WITH A SECURED IDENTIFICATION SYSTEM

This claims the benefit of French Patent Application FR 10 56260, filed Jul. 29, 2010 and hereby incorporated by reference herein.

The present invention relates to a mobile phone of the type comprising:

a connection means, able to allow the connection to a webpage with a particular URL, the connection to said webpage requiring the entry of a particular identifier specific to said webpage, a first storage means able to store, in a database, the particular identifiers, each associated with a corresponding webpage.

BACKGROUND

Certain webpages, such as messaging pages, are restricted-access pages and are only accessible to a user after entering a particular identifier, specific to that page. Some web browsers, installed on mobile phones, propose to the user to store the particular identifier, associated with the address of the page, in a database stored in the memory of the phone. Thus, during subsequent connections to said page, the user does not need to enter his particular identifier, the latter being automatically inserted by the mobile phone. The user's browsing comfort is thus increased.

SUMMARY OF THE INVENTION

Such a solution is not, however, fully satisfactory. Particular identifiers are sensitive data. However, the web browsers installed on mobile phones and operating, in particular, under an Android operating system, store the particular identifiers without much security. Thus, a person with bad intentions who comes into possession of a mobile phone can, by connecting to a restricted-access page, access that page without knowing the particular identifier associated with said page, the latter being proposed automatically by the phone.

It is an object of the present invention to provide a mobile phone offering significant securing of the identification data, while being easy to use and user-friendly.

The present invention provides a mobile phone of the aforementioned type, characterized in that the phone also comprises a triggering means able to systematically and automatically trigger, after the entry of a particular identifier, the implementation of a means for choosing a primary identifier shared by all webpages requiring that a particular identifier be entered, if no primary identifier has been chosen yet, and a second storage means able to store a security datum depending on the primary identifier after the entry of the primary identifier.

According to specific embodiments, the mobile phone according to the invention can also comprise one or more of the following features, considered alone or according to all technically possible combinations:

the mobile phone comprises a saving means for saving the particular identifier, able to save the particular identifier only if the primary identifier has been chosen and to induce the storage in the database of the saved particular identifier by the first storage means;

the triggering means is also able to systematically and automatically trigger the implementation of a means for entering the primary identifier after a particular identifier not yet stored in the database is entered and if the primary identifier has already been chosen, and the mobile phone comprises a saving means for saving the particular identifier that is able to save the particular identifier only if the primary identifier has been entered and to induce the storage in the database of the saved particular identifier by the first storage means;

the mobile phone comprises a search means, able to determine the presence in the database of the webpage to which the connection means is connected, and therefore of the associated particular identifier, the search means being able to trigger the implementation of a means for entering the particular identifier if the particular identifier associated with the webpage is not stored in the database and the implementation of a means for entering the primary identifier without previously implementing a means for entering the particular identifier otherwise;

the mobile phone comprises a session activation means comprising a clock, able to determine an elapsed time since the last entered primary identifier, a means for comparing the elapsed time determined by the clock with a predetermined time, the session activation means being able to provide the particular identifier without previously entering the primary identifier if the elapsed time is shorter than the predetermined time;

the mobile phone comprises a modification module for modifying the primary identifier, that can be implemented during implementation of the means for entering the primary identifier;

the triggering means can also automatically trigger the implementation of an inquiry means as to whether to save the entered particular identifier before implementing the means for choosing the primary identifier;

the particular identifiers are stored in the database in encrypted form using a random encryption key;

the mobile phone comprises a means for generating the security datum, able to encrypt the encryption key of the particular identifier using the primary identifier, so as to generate the security datum stored by the second storage means;

the mobile phone comprises an encryption means able to encrypt the particular identifier, saved by the saving means, using the random encryption key, the random encryption key having been previously decrypted from the security datum using the entered primary identifier; and the mobile phone comprises a SIM card and the first and second storage means are provided on the SIM card.

The invention also relates to a method implemented by the mobile phone as defined above, successively comprising the following steps:

connecting via the connecting means of the mobile phone to a webpage having a particular URL and requiring that a particular identifier be entered;

triggering the implementation of a means for choosing a primary identifier after the entry of a particular identifier, if no primary identifier has been chosen yet; and after the entry of the primary identifier, storing a security datum depending on the primary identifier using the second storage means.

According to one particular embodiment, the inventive method comprises, before implementation of the means for choosing the primary identifier, a step consisting in triggering the implementation of an inquiry means, proposing to the user to save the entered particular identifier.

The invention also relates to a computer program product including instructions that, when implemented by a computer incorporated in a mobile phone, implements the method as defined above.

BRIEF DESCRIPTION OF THE DRAWINGS

The invention will be better understood upon reading the following description, provided solely as an example and done in reference to the appended drawings, in which:

FIGS. 4 to 23 are screenshots of the screen of the phone during successive steps of the method for connecting to a restricted-access page in different situations;

FIGS. 24 to 26 show modification windows for modifying a primary identifier;

The invention in particular applies to a mobile phone 2 operating under an Android® operating system by the company Google.

DETAILED DESCRIPTION

Figure 1:
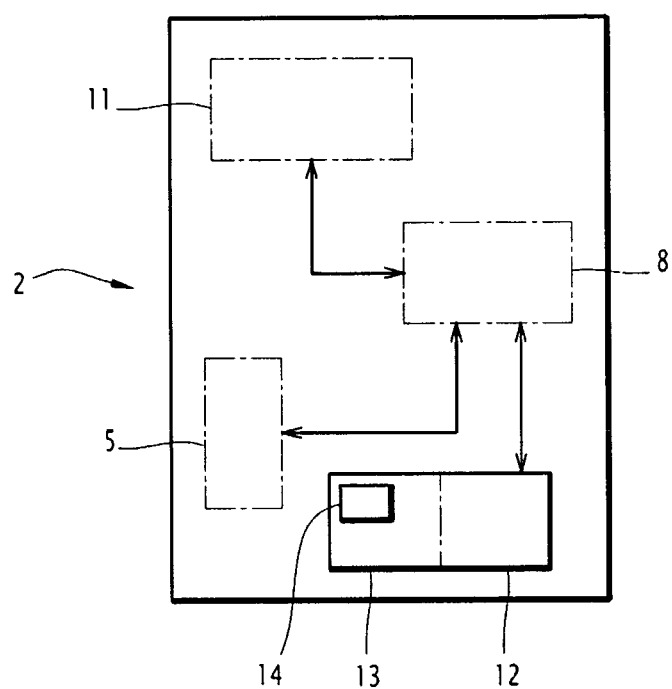
FIG. 1 is a diagrammatic illustration of a mobile phone according to the invention.

FIG. 1 diagrammatically illustrates a mobile phone 2 according to the invention. The mobile phone 2 is provided with a removable SIM (Subscriber Identity Module) card 5, which is able to interact with a microprocessor 8 of the mobile phone 2. It also comprises a man-machine interface 11, such as a screen and keypad, able to allow an interaction between the mobile phone 2 and the user, as well as a memory, comprising a random access memory (RAM) 12 and a non-volatile memory 13, also called ROM.

The phone 2 includes a means for connecting to a computer network, in particular the Internet, able to connect to webpages chosen by the user. These webpages are defined by their URL (Uniform resource locator). The connection means in particular includes a web browser 14.

Figure 2:
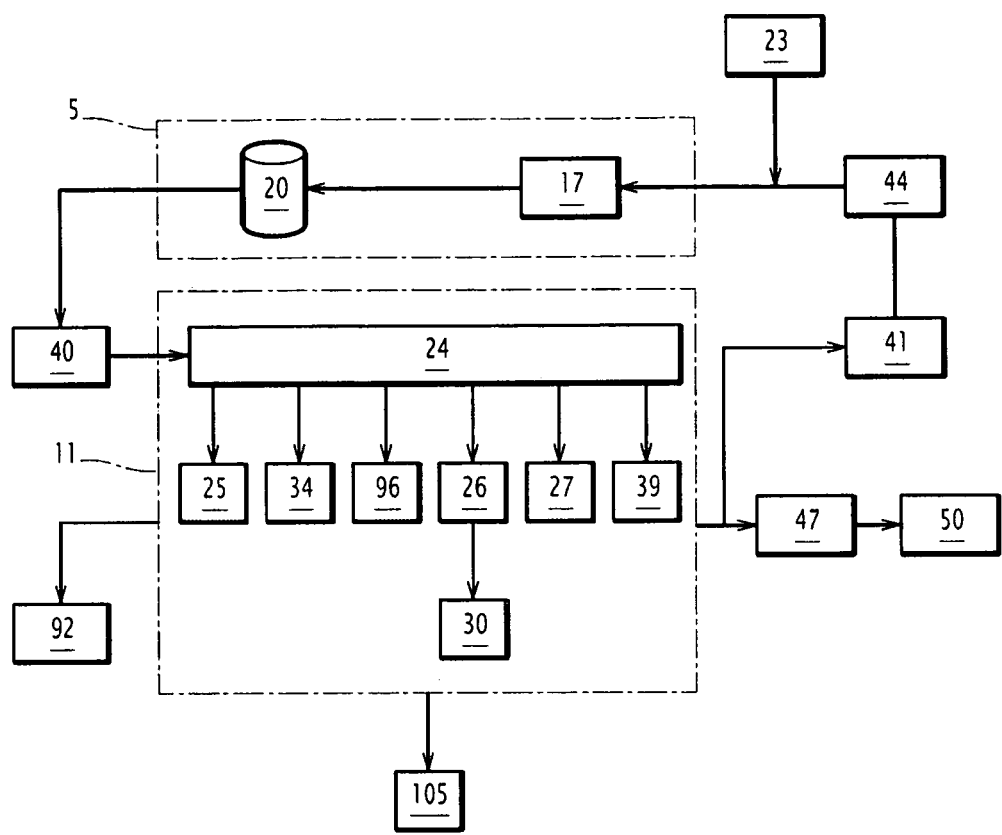
FIGS. 2 and 3 are diagrammatic illustrations in the form of functional modules of means implemented by the phone according to FIG. 1.

FIG. 2 shows, in the form of functional modules, means implemented by the mobile phone 2 of FIG. 1, and participating in securing identifiers specific to the user of the phone 2, as well as participating in the user-friendliness of the phone 2.

A first storage means 17 is able to store, in a database 20, particular identifiers saved by the user, associated with the corresponding URLs. The first storage means 17 is provided on the SIM card 5 of the phone 2, in particular in a secured partition thereof. In the database 20, the particular identifiers are stored in encrypted form, the encryption being carried out by an encrypting means 23 using a random encryption key. The associated URLs are stored in unencrypted form.

In the rest of the description, "restricted-access page" refers to a webpage whereof the content is only accessible after a user enters a particular identifier, specific to the page. These restricted-access pages are for example messaging pages or login pages for social networks. The particular identifier in particular comprises a user name and a password. Furthermore, "primary identifier" refers to an identifier chosen by the user and identical for all restricted-access pages. Hereafter, means for entering the primary identifier and the particular identifier will be described.

The man-machine interface 11 comprises a triggering means 24, able to automatically trigger the implementation of an entry means or an inquiry means depending on the nature of the information received as an input by the triggering means 24.

Thus, the triggering means 24 can trigger automatically, as soon as the web browser 14 connects to a restricted-access page, whereof the particular identifier is not yet stored in the database 20, the implementation of a means 25 for entering the particular identifier.

The triggering means 24 is also able to automatically and systematically trigger, immediately after the user enters the particular identifier, the implementation of an inquiry means 26 as to whether the phone 2 should save the particular identifier entered.

If no primary identifier has been chosen by the user yet, the triggering means 24 is able to trigger the implementation of a means 34 for choosing the primary identifier, automatically and systematically after the entry of the particular identifier by the user. The means 34 for choosing the primary identifier is in particular implemented by the triggering means 24 in the event of a positive response by the user regarding the saving of the particular identifier.

If the primary identifier has already been chosen, the triggering means 24 is able to automatically and systematically trigger, either immediately after the user enters the particular identifier and in case of positive response from the user regarding the saving of the particular identifier entered, or in the case where the particular identifier is already stored in the database 20, the implementation of a means 27 for entering a primary identifier.

Thus, the triggering means 24 is able to successively and automatically trigger the implementation of the means 25 for entering the particular identifier and of the means 34 for choosing the primary identifier or of the means 27 for entering the primary identifier if the user chooses to save the particular identifier.

Figure 7:
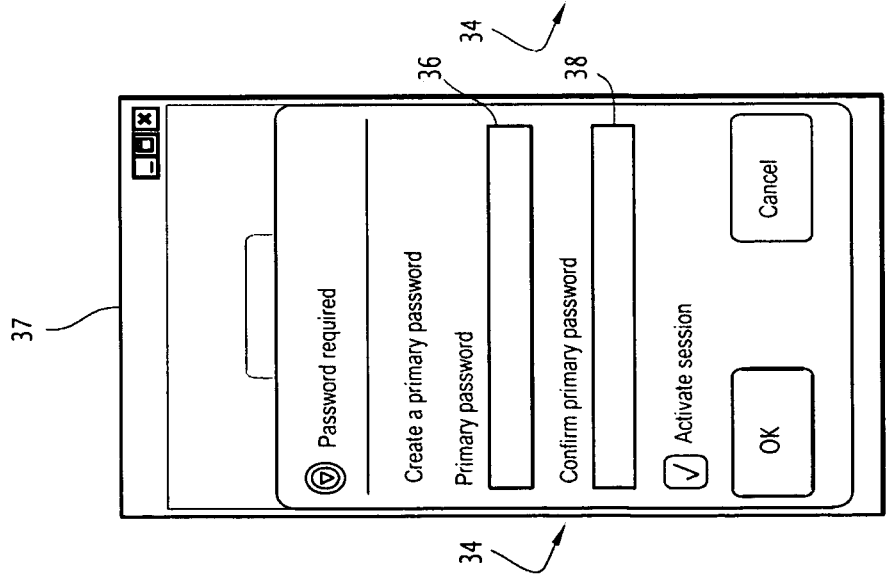
Figures 10, 11, 12:
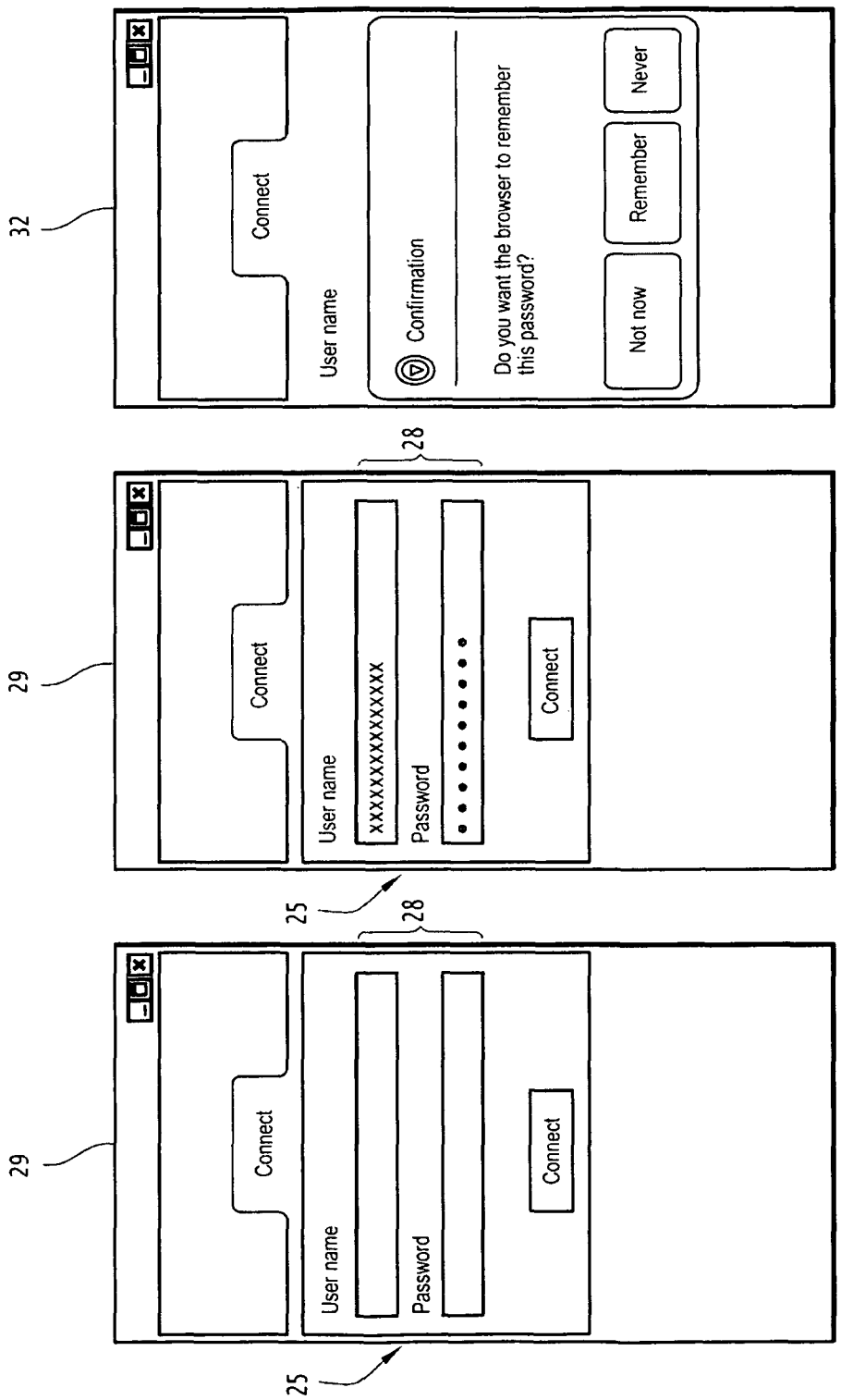

In the illustrated embodiment, the means 25 for entering the particular identifier and the means 27 for entering the primary identifier respectively comprise a zone 28 for entering the particular identifier and a zone 36 for entering the primary identifier. The entry zones 28 and 36 are respectively provided in a window 29 for entering the particular identifier, and in a window 35 for entering the primary identifier. The means 34 for choosing the primary identifier is provided in an initial entry window 37 (FIG. 7). It comprises a zone 36 for entering the primary identifier and a zone 38 for confirming the primary identifier, also intended to receive the primary identifier entered by the user, as a confirmation. The windows 29 and 35 or 37 successively and automatically display one after the other. These are for example pop-up windows, also called intrusive windows. In this embodiment, the inquiry means 26 is provided either in the window 29 for entering the particular identifier, or in a separate dialogue window 32, which can be displayed after the particular identifier is entered and before the entry or choice of the primary identifier.

Lastly, the triggering means 24 is able to trigger the display of a window 39, which is pre-filled with the particular identifier, extracted from the database 20.

The input of the triggering means 24 is connected as input to a search module 40, able to search for the active URL, i.e. the URL of the page to which the browser 14 is connected, in the database 20. The search module 40 is thus able to compare the active URL to the URLs stored in the database 20. It can activate the triggering, by the triggering means 24, of the implementation of the means 25 for entering the particular identifier if the active URL is not stored in the database 20 and, in the opposite case, it can activate the triggering, by the triggering means 24, of the implementation of the means 27 for entering the primary identifier.

The mobile phone 2 also comprises an authentication module 41. The authentication module 41 can verify the accuracy of the primary identifier entered, i.e. authenticate the primary identifier entered, and authorize in case of positive authentication, access to the active page.

The output of the authentication module 41 is connected to the saving means 44, which can save the particular identifier entered if the authentication module 41 has authenticated the primary identifier entered. The output of the saving means 44 is connected to the first storage means 17. This first storage means 17 can store, in encrypted form in the database 20, the particular identifier saved by the saving means 44.

According to one embodiment, the phone 2 also comprises a session activation means 47. The session activation means 47 can receive, from the man-machine interface 11, a session activation instruction when the user activates a session activation option, for example provided in the window 35 for entering the primary identifier or in the initial entry window 37. A session corresponds to a predetermined session length of time from the entry of the primary identifier, during which the user is not asked to reenter the primary identifier. This length is for example thirty minutes. When it has received a session activation instruction, the session activation means 47 can trigger a clock 50, which can count the time elapsed since the last entry of the primary identifier. The session activation means 47 can also command the saving of the encryption key for encrypting the particular identifiers in the RAM 12 of the mobile phone 2, then its erasure from the RAM 12 when the predetermined session length has elapsed. Alternatively, the encryption key is always in the RAM 12 of the phone 2 and the encryption key is made accessible to decrypt a particular identifier when a session is activated, without the primary identifier needing to be reentered.

Thus, the session activation means 47 is able to provide the particular identifier, decrypted from the database 20 using the saved encryption key, without prior entry of the primary identifier.

Figure 3:
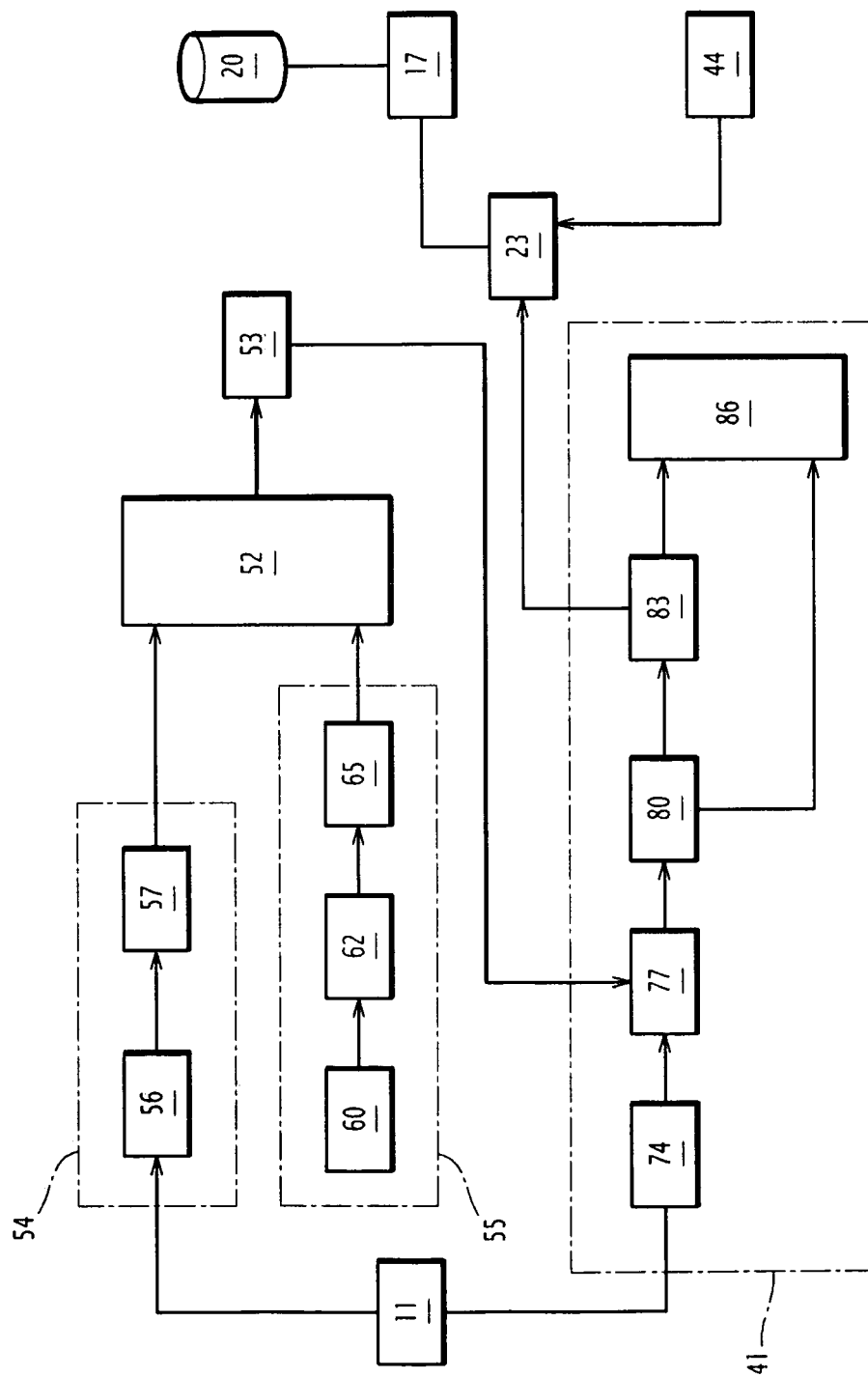

A means 52 for generating a security datum, shown in FIG. 3, is able to provide, from the primary identifier chosen by the user, a security datum, stored in a second storage means 53. The security datum contains the encryption key for encrypting the particular identifiers.

The input of the means 52 for generating the security datum is connected to a means 54 for acquiring and processing the primary identifier, able to receive a primary identifier via the man-machine interface 11 and to provide, as output, a hashed primary identifier. The input of the means 52 is also connected to a means 55 for generating and processing the encryption key, which is able to provide a signed random encryption key.

The means 54 for acquiring and processing the primary identifier comprises a module 56 for acquiring the primary identifier, which can receive the primary identifier entered by the user, when the latter is chosen by the user, i.e. entered for the first time or when a new primary identifier is entered in case of a modification of the primary identifier by the user. It also comprises a first hashing module 57, which is able to apply a first hashing function to the chosen primary identifier and to provide, as output, a hashed primary identifier. In the described embodiment, the primary identifier includes four characters; the first hashing function is an MD5-type function and the hashed primary identifier has 128 bits.

The means 55 for generating and processing the encryption key comprises a random generator 60, which is able to randomly generate the encryption key, and a second hashing module 62, which is able to apply a second hashing function to the encryption key to provide a hashed encryption key, also called signature of the encryption key. A calculating means 65 is able to concatenate the encryption key with its signature so as to provide a signed encryption key. In the described embodiment, the encryption key has 128 bits; the second hashing function is a SHA-1 function and the signature of the encryption key has 160 bits.

The means 52 for generating the security datum can encrypt the signed encryption key received from the means 55 for generating and processing the encryption key using an encryption algorithm, using as key the hashed primary identifier received from the means 54 for acquiring and processing the primary identifier, to provide an encrypted signed encryption key, which constitutes the security datum.

The second storage means 53, able to store the security datum, is connected to the means 52 for generating the security datum. It is provided in the SIM card 5, in particular in the secured partition thereof.

In the described embodiment, the encryption algorithm implemented by the means 52 for generating the security datum is a symmetrical algorithm, in particular an algorithm of the AES (advanced encryption standard) type.

The authentication module 41 is shown in more detail in FIG. 3. It is able to authenticate, from the security datum, the primary identifier entered by the user. It can receive, as input, said primary identifier via the man-machine interface 11. It comprises a third hashing module 74 that can apply the same hashing function as the first hashing module 57 to the entered primary identifier to provide a hashed primary identifier as output.

A decryption module 77 is able to apply the same algorithm as the means 52 for generating the security datum to decrypt the security datum stored in the second storage means 53. It can apply the encryption algorithm to the security datum, using as key the hashed primary identifier coming from the third hashing module 74 so as to provide, as output, a decrypted signed encryption key comprising a decrypted encryption key concatenated with its decrypted signature.

A second calculating means 80 can separate the decrypted encryption key from the decrypted signature. This decrypted encryption key, provided at the output of the authentication module 41, is the encryption key used by the encryption means 23 to encrypt the particular identifiers. The authentication module 41 is thus able to extract, using the primary identifier entered by the user, the encryption key for the security datum stored by the second storage means 53.

A fourth hashing module 83 can supply a hashed decrypted encryption key by applying the same hashing function as the second hashing module 62 to the decrypted encryption key.

Lastly, a comparator 86 can compare the hashed decrypted encryption key to the decrypted signature and conclude that the entered primary identifier is authentic, i.e. identical with the chosen primary identifier used by the generating means 52 to generate the security datum, if the hashed decrypted encryption key is identical to the decrypted signature.

The encryption means 23 can encrypt the particular identifier saved by the saving means 44 using the security datum. To that end, it receives, as input, the decrypted encryption key provided at the output of the authentication module 41 and can apply an encryption algorithm to the particular identifier using said key as the encryption key.

According to one embodiment, and as illustrated in FIG. 2, the mobile phone 2 comprises a modification module 92, which can allow the user to modify his primary identifier. The modification module 92 is able to receive modification instructions via the man-machine interface 11. It can be implemented during implementation of the means 27 for entering the primary identifier. Thus, the user can, via the modification module 92, modify his primary identifier each time the means 27 for entering the primary identifier is implemented.

To that end, a modify button 95, for example comprised in the window 35 for entering the primary identifier, can be activated by the user when he wishes to modify the primary identifier. In this embodiment, the triggering means 24 can automatically trigger the implementation of a modification means 96, when the user activates the modify button 95. The modification means 96 comprises a zone 36 for entering the current primary identifier and a zone 101 for entering a new primary identifier, in particular comprised in a modify window 98 (FIG. 25).

The authentication module 41 is able to authenticate the current primary identifier entered and to provide, at the output thereof, the decrypted encryption key. The modification module 92 can command the generation of a new security datum by the means 52 for generating the security datum, from the decrypted encryption key provided as output from the authentication module 41 and the new primary identifier chosen by the user, the new security datum being stored by the second storage means 53 in place of the previous security datum.

According to one embodiment, the mobile phone 2 comprises a reset means 105, which makes it possible to reset the particular identifier. The reset means 105 can receive a reset instruction via the man-machine interface 11. To that end, a reset button 107, for example comprised in the window 35 for entering the primary identifier or in the modify window 98 (FIG. 25), can be activated by the user when he wishes to reset the primary identifier. The reset means 105 is able to erase the security datum, as well as all particular identifiers and associated URLs from the database 20.

FIGS. 4 to 9 show a first situation in which, at the time of the connection to the page 110, the primary identifier has not yet been chosen and the particular identifier is not stored in the database 20.

FIGS. 10 to 15 show a second situation in which, at the time of the connection to the page 110, the primary identifier has already been chosen, but the particular identifier is not stored in the database 20.

FIGS. 16 to 19 show a third situation in which, at the time of the connection to the page 110, the primary identifier has already been chosen and the particular identifier is stored in the database 20.

FIGS. 20 and 21 show a fourth situation in which, at the time of the connection to the page 110, the primary identifier has already been chosen, the particular identifier is stored in the database 20 and a session is activated.

Figure 23:
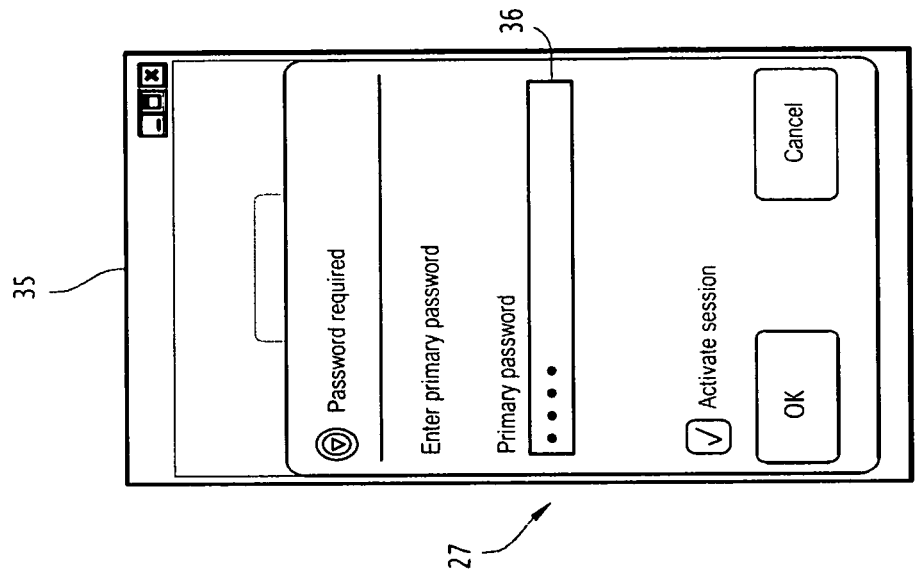
Figure 22:
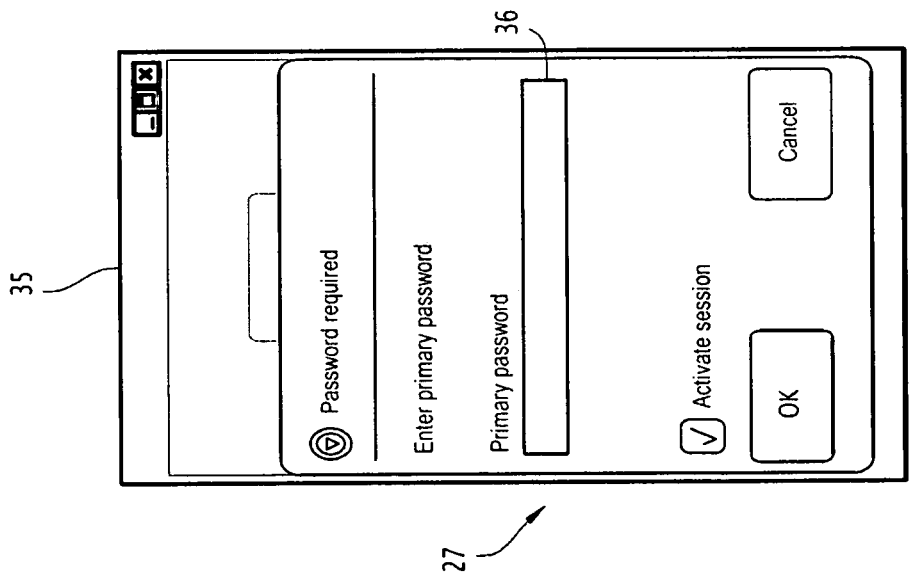

FIGS. 22 and 23 show a fifth situation in which a session was activated and has expired.

Figure 27:
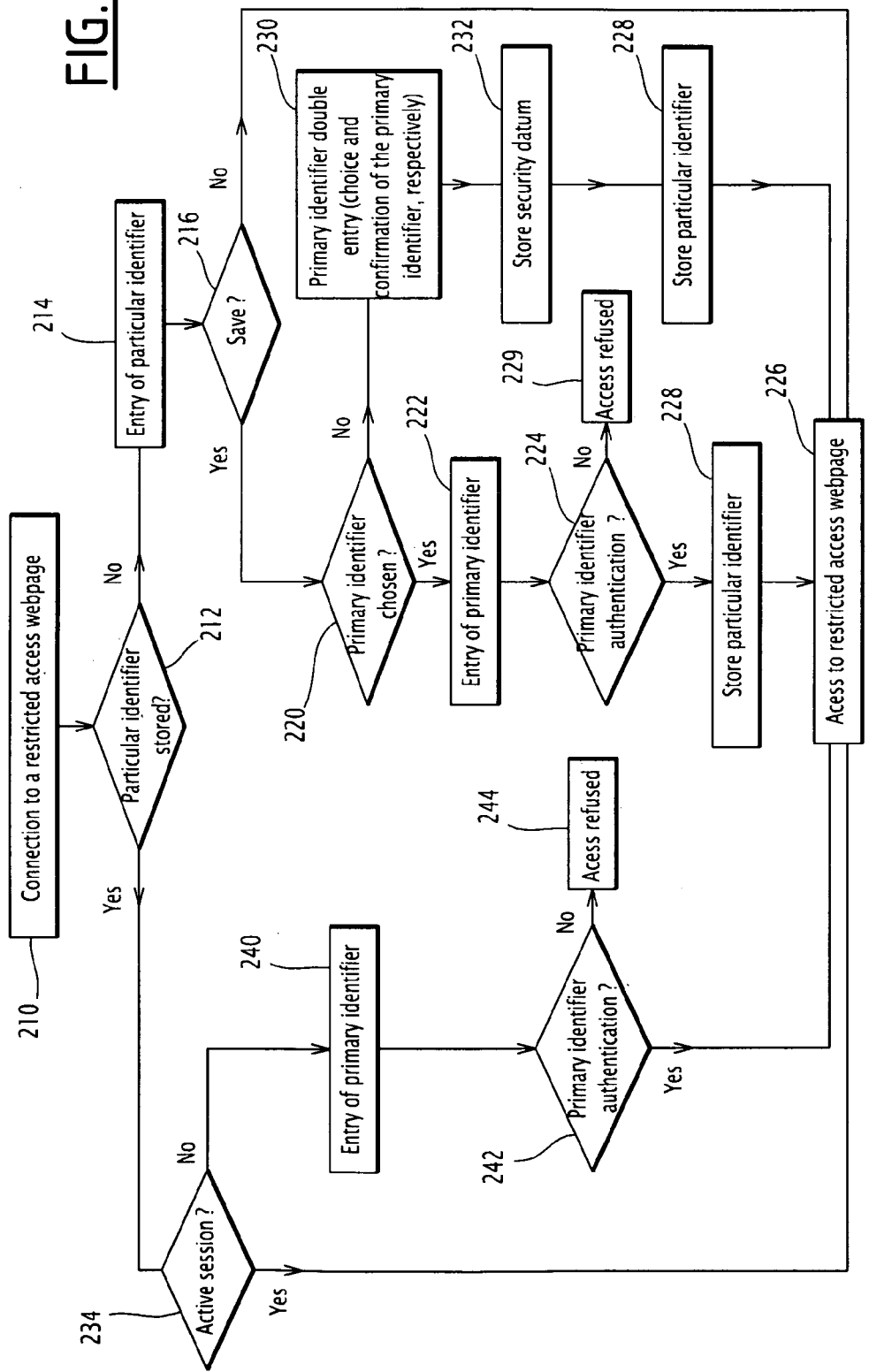
FIG. 27 is a flowchart illustrating the method for connecting to a restricted-access page.

The method for secured connection to a restricted-access page 110 will now be explained in the different situations using FIGS. 4 to 23, and in reference to FIG. 27.

During a connection step 210, the web browser 14 connects to the restricted-access webpage 110 chosen by the user. The search module 40 then searches, in a search step 212, whether the URL for this page 110 is stored in the database 20 by comparing the URLs stored in the database 20 with the active URL.

Figure 6:
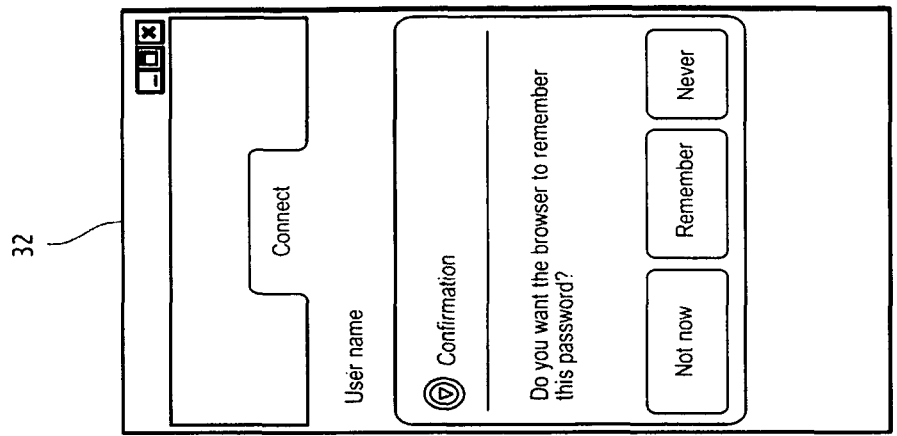
Figure 5:
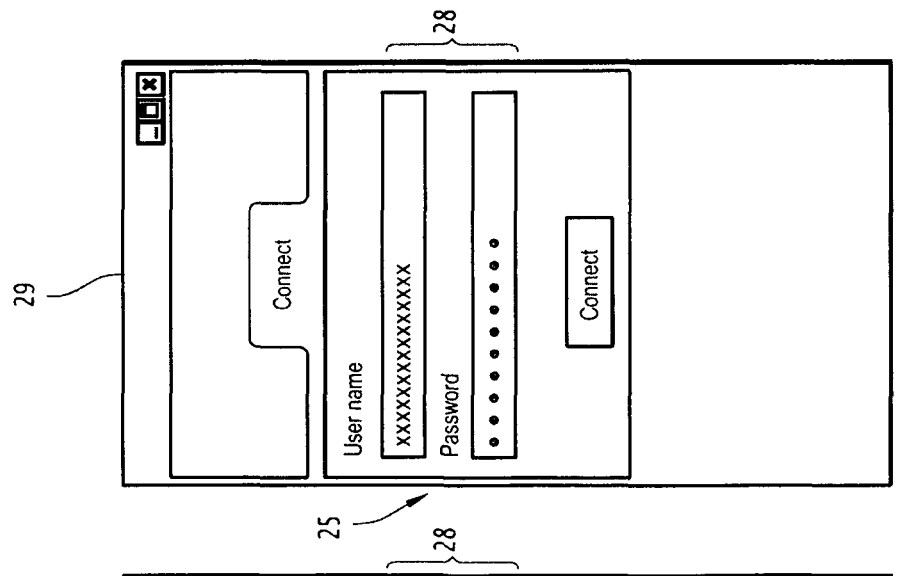
Figure 4:
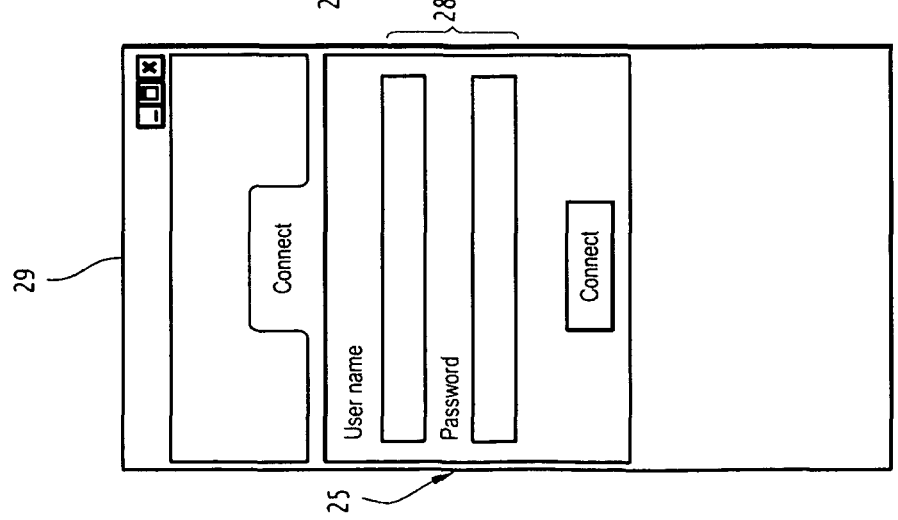

If the search module 40 notes, during the test in step 212, that the active URL is not yet stored in the database 20 (FIGS. 4 to 9 and 10 to 15), it activates the triggering means 24, which triggers the implementation of the means 25 for entering the particular identifier, provided in the window 29 for entering the particular identifier (FIGS. 4/10). In a step 214, the user enters the particular identifier corresponding to the active URL (FIGS. 5/11). In a step 216, he chooses whether he wishes for the particular identifier to be saved (FIGS. 6/12).

In the event of a positive response in step 216, the phone 2 checks, in a verification step 220, whether the primary identifier has already been chosen, for example by checking whether a security datum is stored in the second storage means 53.

Figure 14:
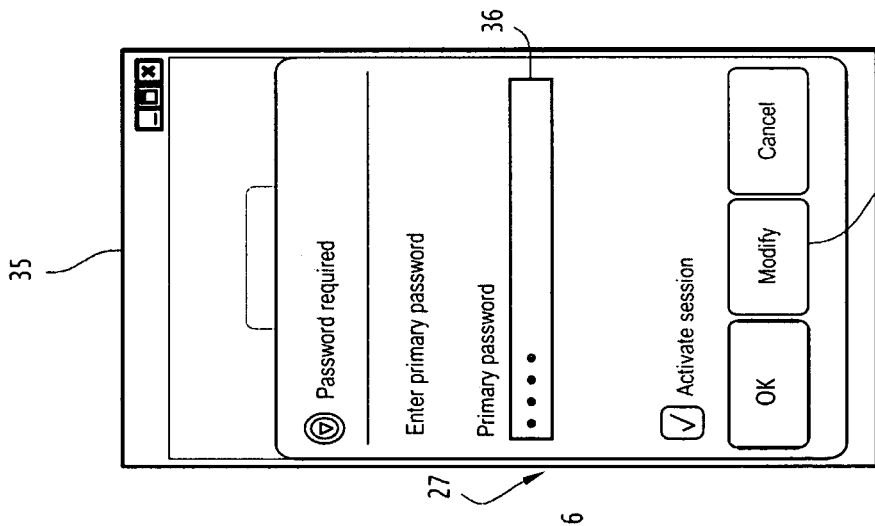
Figure 13:
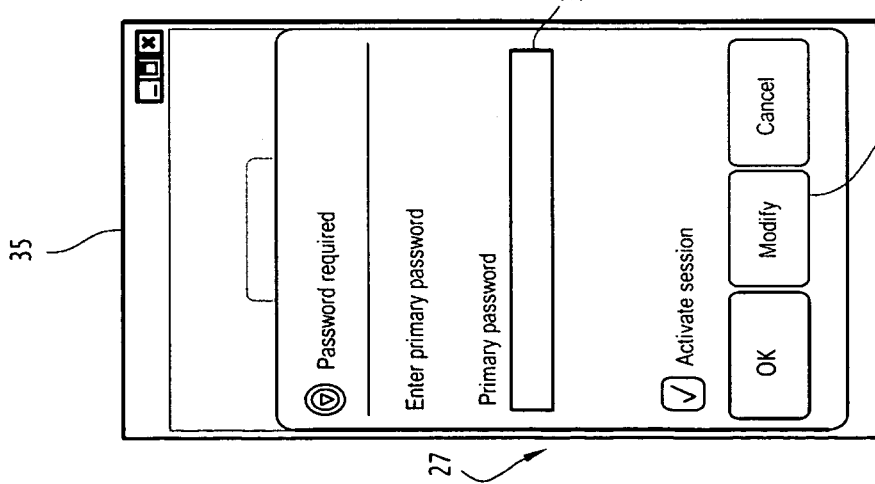
Figure 18:
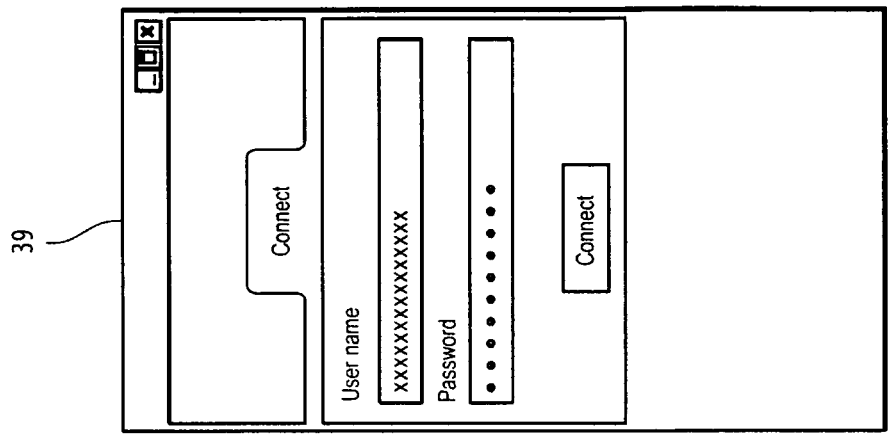

In the event of a positive response to the test during step 220, i.e. if a primary identifier has already been chosen, the triggering means 24 automatically and systematically triggers the implementation of the means 27 for entering the primary identifier, provided in the window 35 for entering the primary identifier (FIG. 13). The user then enters, in a step 222, his primary identifier via the entry means 27 (FIG. 14).

The authentication module 41 then authenticates, in a step 224, the primary identifier entered in step 222.

Figure 28:
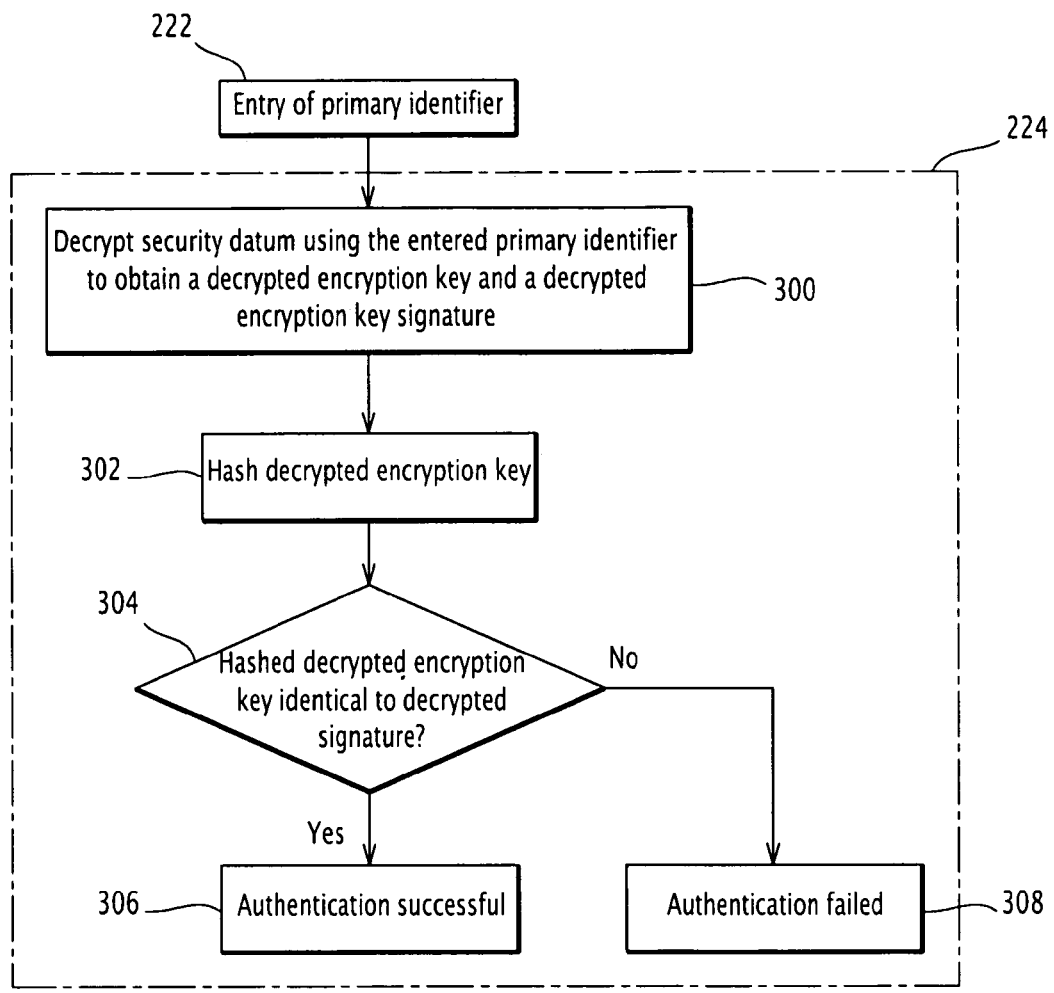
FIG. 28 is a flowchart illustrating the method for authenticating the primary identifier entered using a security datum.

The method for authenticating the primary identifier, implemented in step 224 by the authentication module 41, is explained in reference to FIG. 28. The authentication module 41 decrypts, in a step 300, the security datum stored by the second storage means 53, using the encryption algorithm, using as key the hashed primary identifier, obtained by hashing the primary identifier entered in step 222 by means of the hashing module 74. It thus obtains a decrypted encryption key, associated with a decrypted signature. It then hashes, in a step 302, the decrypted encryption key, extracted from the security datum in step 300, then compares, in a step 304, the hashed decrypted encryption key to the decrypted signature. In the event the encryption key extracted from the security datum and hashed is identical to the signature extracted from the security datum, the authentication module 41 authenticates the primary identifier in a step 306.

Figure 15:
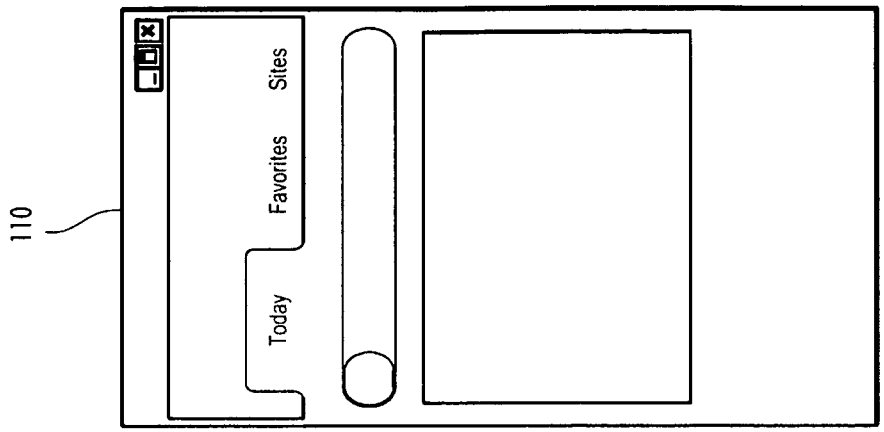

In the event of a positive authentication at the end of step 224, the authentication module 41 authorizes, in a step 226, access to the webpage 110 (FIG. 15).

Only after entry and authentication of the primary identifier, the saving means 44 saves the particular identifier. The encryption means 23 then encrypts the particular identifier using the encryption key, extracted from the security datum by the authentication module 41 during step 300 of the method for authenticating the primary identifier, implemented in step 224.

The encryption means 23 encrypts the particular identifier saved by the saving means 44 using the encryption algorithm, using as key the encryption key extracted from the security datum by the authentication module 41 during step 300 of the authentication method.

Lastly, the first storage means 17 stores, in step 228, the encrypted particular identifier in the database 20, associating it with the URL of the active page 110.

In the event of a negative response to the test in step 224, i.e. in the event the authentication fails, in a step 229 the authentication module refuses access to the page 110.

Figure 8:
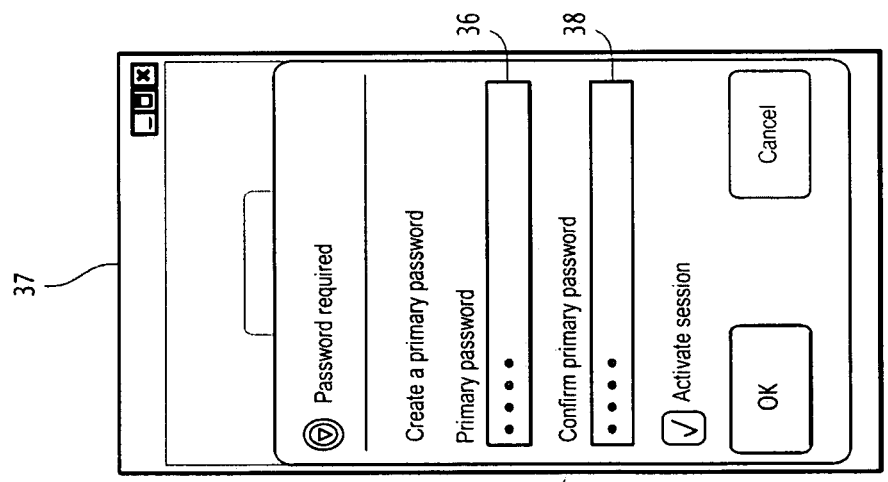
Figure 29:
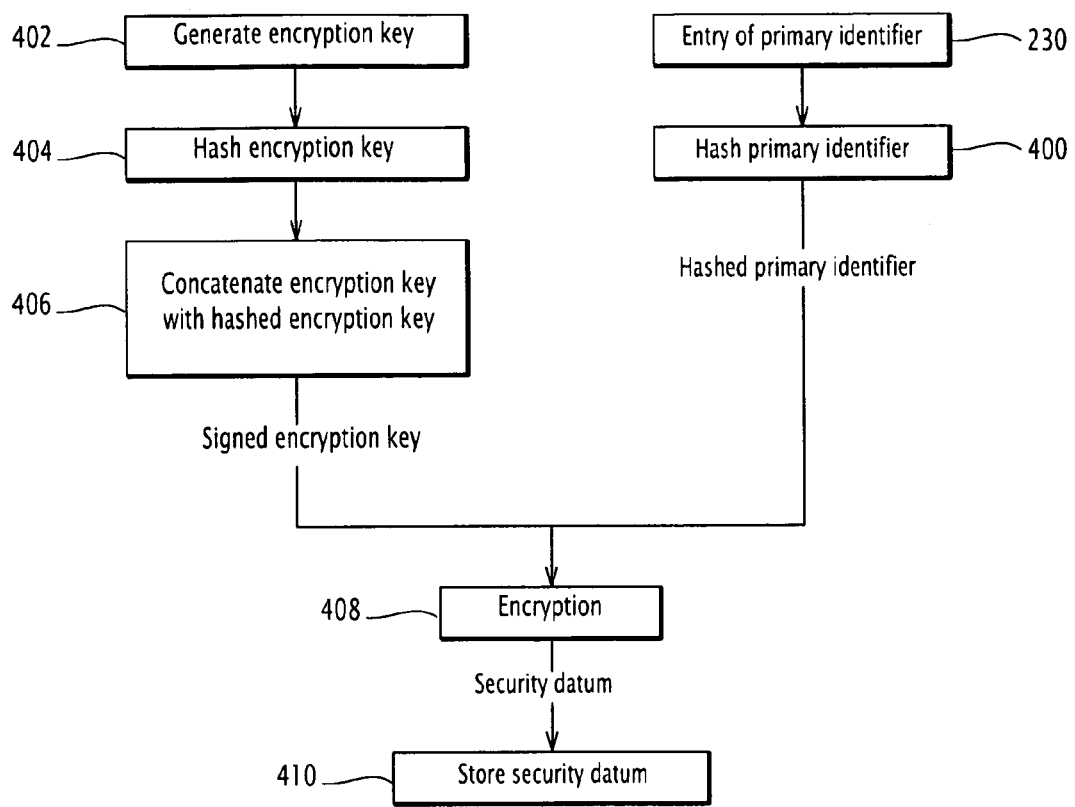
FIG. 29 is a diagram illustrating the method for generating the security datum from a chosen primary identifier.

In the event of a negative response to the test in step 220, i.e. if the primary identifier has not yet been chosen, the triggering means 24 automatically and systematically triggers the implementation of the means 34 for choosing the primary identifier, provided in the initial entry window 37 (FIG. 7). The user then chooses his primary identifier in a step 230, by entering it via the means 34 for choosing the primary identifier. He confirms his choice by reentering the primary identifier in the confirmation zone 37 (FIG. 8). Simultaneously or preceding the step 228 for storing the particular identifier, the second storage means 53 then stores, in step 232, the security datum, which depends on the primary identifier. The security datum is obtained from the primary identifier using a method diagrammatically illustrated in FIG. 29. The means 52 for generating the security datum generates the security datum from the primary identifier entered and a random encryption key. To that end, the means 54 for acquiring and processing the primary identifier hashes, in a step 400, the primary identifier entered in step 230. In a step 402, the means 55 for generating the encryption key randomly generates an encryption key, in a step 404 it determines the signature of the encryption key, and in a step 406, concatenates the key with its signature to generate a signed key. In a step 408 the means 52 for generating the security datum then encrypts this signed encryption key using the encryption algorithm, using as key the hashed primary identifier, thereby generating the security datum. The second storage means 53 then stores the security datum in a step 410.

Figure 9:
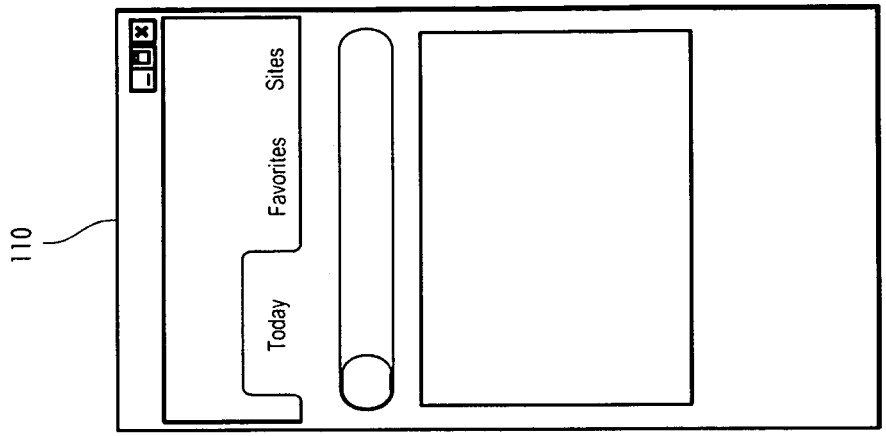

The particular identifier is then encrypted by the encryption means 23, using an algorithm using as key the random encryption key, then the particular identifier is stored in encrypted form in step 228. The web browser 14 can then access the page 110 during step 226 (FIG. 9).

If the user chooses to activate a session, for example by activating, during the entry of the primary identifier, the session activation option, for example provided in the window 35 for entering the primary identifier or in the initial entry window 37, the session activation means 47 triggers the clock 50 and commands the saving, in the RAM 12 of the phone 2, of the encryption key extracted from the security datum by the authentication module 41 in step 300 or keep the encryption key generated during step 402 by the means 55 for generating the encryption key in the RAM 12. Alternatively, the encryption key is always in the RAM 12 and the encryption key is made accessible for decrypting a particular identifier when a session is activated, without the primary identifier needing to be reentered.

If during the search step 212, the search module 40 notes that the active URL is already stored in the database 20 (FIGS. 16 to 19), in step 234 the phone 2 verifies whether a session is active.

Figure 17:
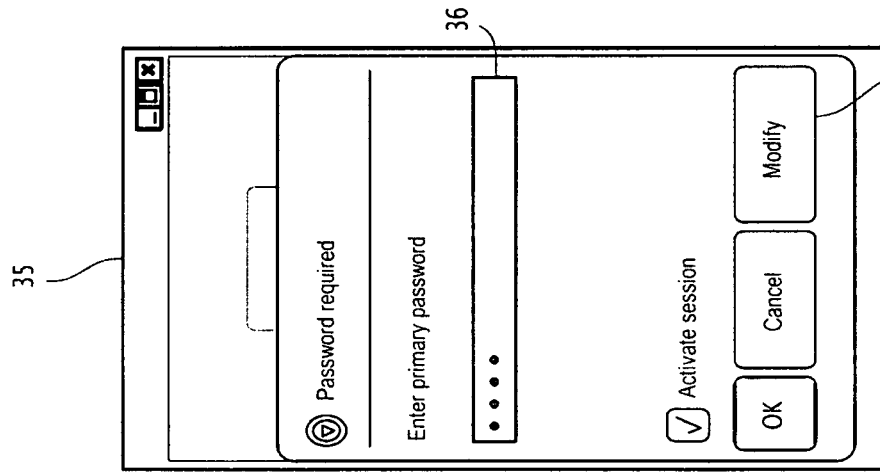
Figure 16:
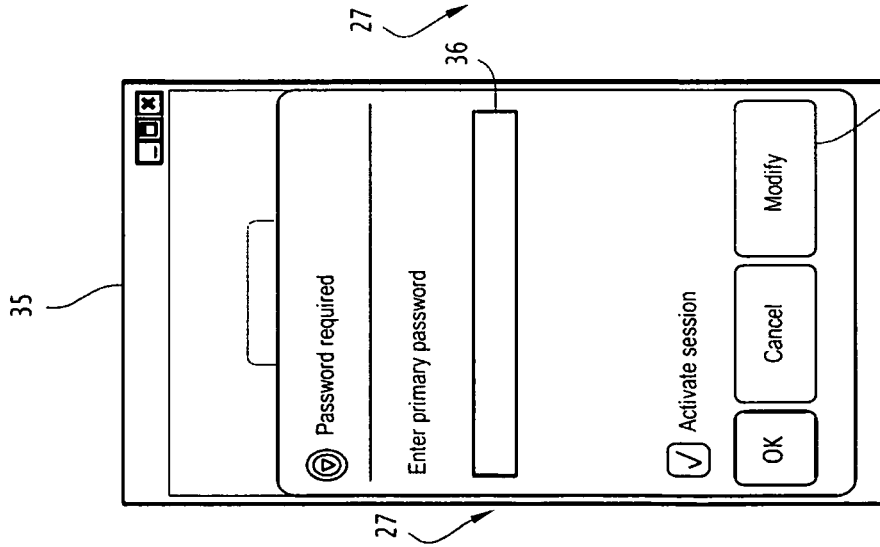
Figure 19:
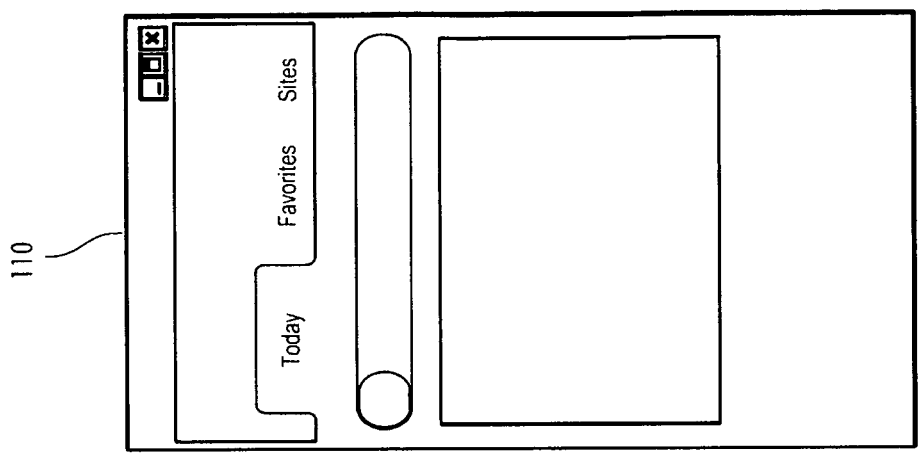

In the event of a negative response to the test in a step 234, i.e. if no session is active, the search module 40 activates the triggering means 24, which automatically triggers the implementation of the means 27 for entering the primary identifier, without previously implementing the means 25 for entering the particular identifier (FIG. 16). In a step 240, the user enters the primary identifier (FIG. 17). In a step 242, which is identical to step 224, the authentication module 41 verifies the accuracy of the primary identifier entered. In the event of a positive response to the test in step 242, i.e. in the event of a successful authentication, the encryption means 23 decrypts the particular identifier associated with the active URL using the encryption key, extracted from the security datum by the authentication module 41. The triggering means 24 then triggers the display of the pre-filled window 39 pre-filled with the decrypted particular identifier (FIG. 18), thereby allowing access to the page 110 (FIG. 19) in step 226.

In the event the authentication fails in step 242, the authentication module 41 refuses access to the page 110 in a step 244.

If an active session is detected in step 234 (FIGS. 20 and 21), as soon as the browser 14 connects to the restricted-access page 110 selected by the user, the decryption means 23 decrypts the corresponding particular identifier stored in the database 20 using the encryption key previously saved in the RAM 12. The triggering means 24 then automatically triggers the display of the pre-filled window 39 pre-filled with the decrypted particular identifier corresponding to the entered URL (FIG. 20), thereby allowing access to the page 110 (FIG. 23), without prior implementation of the means 27 for entering the primary identifier.

When the predetermined session length has elapsed, the session expires and the triggering means 24 triggers the implementation of the means 27 for entering the primary identifier, provided in the window 35 for entering the primary identifier (FIG. 22), access to the page 110 being allowed only after the primary identifier is entered by the user (FIG. 23) and after its accuracy is verified by the authentication module 41. In the event the entered primary identifier is not correct, access to all of the pages currently used is interrupted.

FIGS. 24 to 26 show the situation in which a user wishes to modify his primary identifier.

When the user wishes to modify his primary identifier, he activates the modification module 92, for example by clicking on the modify button 95 of the man-machine interface 11. The triggering means 24 then triggers the implementation of the modification means 96, provided in the modify window 98 (FIG. 25). The user then enters his current primary identifier and his desired primary identifier via the modification means 96, i.e. by entering them in the zone 36 for entering the primary identifier and the zone 101 for entering the new primary identifier, respectively (FIG. 26). The authentication module 41 then authenticates the entered primary identifier. If the authentication is successful, the modification module 92 modifies the primary identifier by commanding the generation of a new security datum via the means 52 for generating the security datum, from the decrypted encryption key provided at the output of the authentication module 41 and the new primary identifier chosen by the user. To that end, the means 52 for generating the security datum receives, as input, the encryption key extracted from the security datum by the authentication module 41 in step 300, as well as the entered new primary identifier, hashed by the hashing module 57. It then encrypts this encryption key using the encryption algorithm, using the hashed new primary identifier as key. It thus creates a new security datum. The latter is stored by the second storage means 53 in place of the previous security datum.

The securing of the connection identifiers by the mobile phone 2 according to the invention is particularly high. Neither the primary identifier nor the encryption key used to encrypt the particular identifiers before they are stored in the database are saved as such in the phone's ROM or on the SIM card. In fact, the encryption key is stored in encrypted form using the primary identifier. Thus, the primary identifier is only temporarily saved upon its first entry into the phone's RAM to allow the encryption of the encryption key. For authentication, the primary identifier entered by the user during a subsequent connection is used to decrypt the encryption key, the latter then being compared to its signature, stored and decrypted together with the encryption key, to conclude on the accuracy of the primary identifier.

The encryption of the particular identifiers is done using the encryption key, previously decrypted using the entered primary identifier. Thus, the decryption of the particular identifiers requires knowledge of the primary identifier, which cannot simply be deduced from the data stored in the phone's ROM.

The fact that the database and the security datum are recorded on the SIM card and not in the phone's ROM also plays a role in securing the identifiers.

Moreover, the automatic implementation of the means for choosing or entering the primary identifier when the user indicates that he wishes for his particular identifier to be stored increases the user-friendliness of the system, since no manipulation, other than that automatically created by the phone, is necessary to implement secured storage of the particular identifier.

The only identifier that the user must recall is the primary identifier, which is identical for all webpages and can be made up of only four characters, which makes it easier to remember.

The user can also change his primary identifier directly via the window for entering the primary identifier at any time, since said window includes an option to modify the primary identifier. No manipulation outside the windows automatically triggered is therefore necessary.

Lastly, the user-friendliness is also ensured by the possibility offered by the phone of activating a session, during which it is no longer necessary to enter the primary identifier.

The invention claimed is:

1. A mobile phone comprising:
a connector adapted to allow connection to a webpage with a particular URL, the connector to the webpage requiring entry of a particular identifier specific to the webpage;
a first storage adapted to store, in a database, the particular identifiers, each associated with a corresponding webpage;
a trigger adapted to trigger implementation of a selector for choosing a primary identifier shared by all webpages requiring that particular identifiers be entered;
a second storage adapted to store a security datum depending on the primary identifier after the entry choice of the primary identifier;
a processor adapted to determine that the primary identifier has already been chosen;
wherein the trigger is further adapted to systematically and automatically trigger the implementation of an entry for entering the primary identifier after the particular identifier not yet stored in the database is entered, when it is determined that the primary identifier has already been chosen;
an authenticator adapted to authenticate said primary identifier once entered based upon stored security datum;
and a saver adapted to save the particular identifier in response to the primary identifier been authenticated and to induce the storage in the database of the saved particular identifier by the first storage.

2. The mobile phone as recited in claim 1 further comprising a searcher, adapted to determine the presence in the database of the webpage to which the connector is connected, and therefore of the associated particular identifier, the searcher being adapted to trigger the implementation of an entry for entering the particular identifier if the particular identifier associated with the webpage is not stored in the database and the implementation of a further entry for entering the primary identifier without previously implementing the entry for entering the particular identifier if the particular identifier associated with the webpage is stored in the database.

3. The mobile phone as recited in claim 2 further comprising a session activator comprising a clock, adapted to determine an elapsed time since the last entered primary identifier, a comparator for comparing the elapsed time determined by the clock with a predetermined time, the session activator being adapted to provide the particular identifier without previously entering the primary identifier if the elapsed time is shorter than the predetermined time.

4. The mobile phone as recited in claim 1 further comprising a modification module for modifying the primary identifier, the modification module implementable during implementation of the entry for entering the primary identifier.

5. The mobile phone as recited in claim 1 wherein the trigger can also automatically trigger implementation of an inquirer as to whether to save the entered particular identifier before implementing the selector for choosing the primary identifier.

6. The mobile phone as recited in claim 1 wherein the particular identifiers are stored in the database in a form encrypted by a random encryption key.

7. The mobile phone as recited in claim 6 further comprising a generator for generating the security datum, adapted to encrypt an encryption key of the particular identifier using the primary identifier, so as to generate the security datum stored by the second storage.

8. The mobile phone as recited in claim 6 further comprising an encrypter adapted to encrypt the particular identifier, using the random encryption key, the random encryption key having been previously decrypted from the security datum using the entered primary identifier.

9. The mobile phone as recited in claim 6 further comprising a SIM card, the first and second storages being provided on the SIM card.

10. A method implemented by a mobile phone, the method comprising the following steps:
connecting via the connector of the mobile phone to the webpage having a particular URL and requiring that a particular identifier specific to the webpage be entered;
storing, in a database of a first storage, the particular identifiers, each associated with a corresponding webpage;
triggering the implementation of the selector for choosing a primary identifier shared by all webpages requiring that particular identifiers be entered;
after the choice of the primary identifier, storing a security datum depending on the primary identifier using a second storage;
determining that the primary identifier has already been chosen;
systematically and automatically triggering the implementation of an entry for entering the primary identifier after the particular identifier not yet stored in the database is entered, when it is determined that the primary identifier has already been chosen;
authenticating said primary identifier once entered based upon stored security datum;
and saving the particular identifier in response to the primary identifier been authenticated by inducing the storage in the database of the saved particular identifier by the first storage.

11. The method as recited in claim 10 further comprising, before implementation of the selector for choosing the primary identifier, triggering implementation of an inquirer, proposing to the user to save the entered particular identifier.

12. A computer program product including instructions that, when implemented by a computer incorporated in a mobile phone, implements the method as recited in claim 10.

* * * * *